H. C. FAIRCHILD.
Hand-Seeder.
No. 28,567. Patented June 5, 1860.
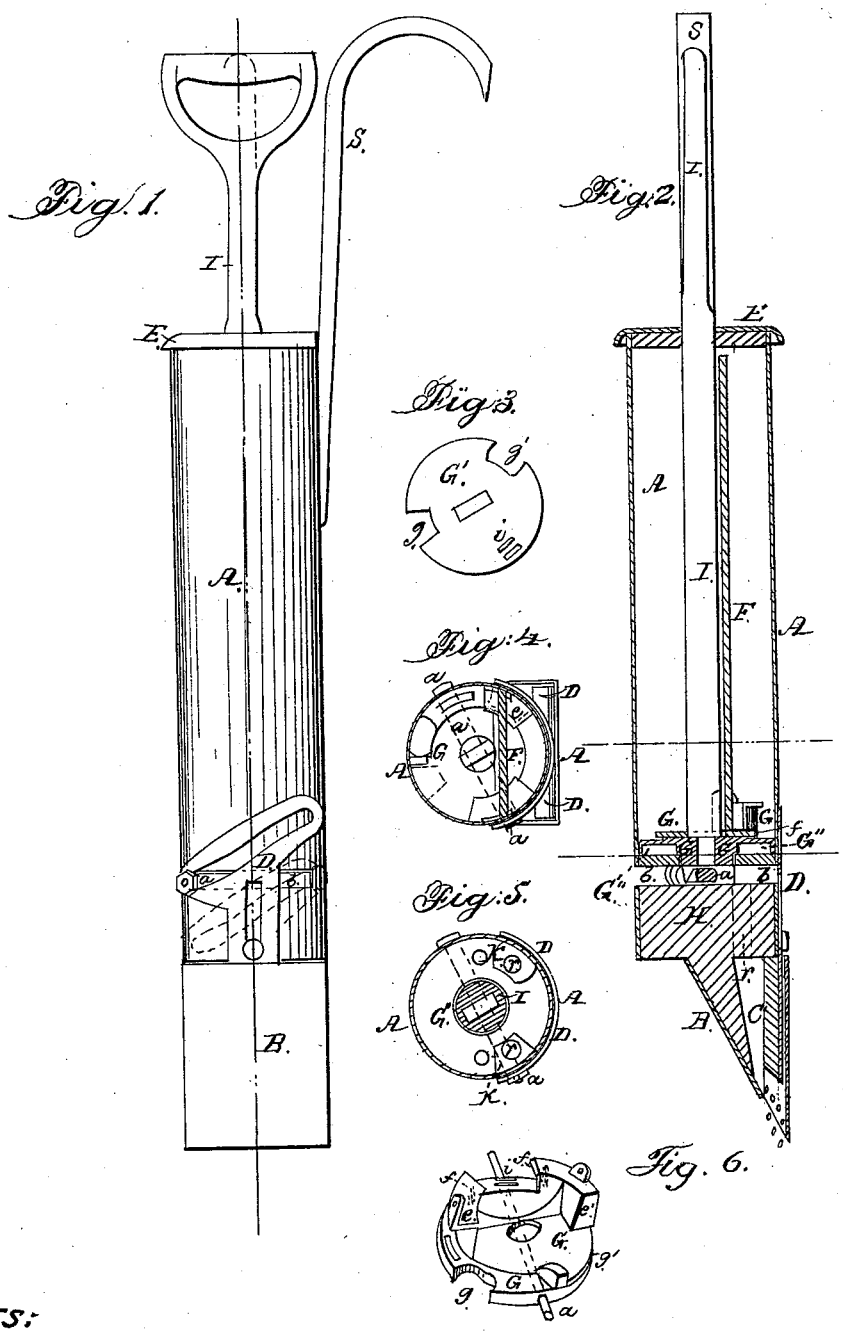

UNITED STATES PATENT OFFICE.

H. C. FAIRCHILD, OF BROOKLYN, PENNSYLVANIA.

IMPROVEMENT IN SEED-PLANTERS.

Specification forming part of Letters Patent No. 28,567, dated June 5, 1860.

*To all whom it may concern:*

Be it known that I, H. C. FAIRCHILD, of Brooklyn, in the county of Susquehanna and State of Pennsylvania, have invented a new and useful Combined Hand Corn and Pumpkin-Seed Planter; and I do hereby declare that the following is a full, clear, and exact description thereof, reference being had to the accompanying drawings, forming a part of this specification, in which—

Figure 1 represents a front view of the planter in elevation. Fig. 2 is a vertical transverse section taken through the same. Figs. 3, 4, 5, and 6 show the parts in detail for distributing the seed from the hoppers.

Similar letters denote like parts in the several figures.

The nature of my invention consists in dividing a cylindrical seed-box in two compartments by a partition, for holding the different seeds and keeping them separated; and, in connection with this, it consists in a novel distributing device for dropping the seeds from the hopper, the same being operated by a semi-rotating movement, and arranged in the manner hereinafter described.

To enable those skilled in the art to fully understand and construct my invention, I will proceed to describe it.

A represents a cylindrical box, which may be of either wood or metal, with a tapering mouth-piece, B, secured to its bottom, in which works a plunger, C, operated by a plate, D, having a vertical and oblique slot in it, so as to raise it at the proper time for depositing the seed into the hole, and to depress it when the machine is removed, a vertical stem, I, being attached to said plate by a bolt, $a$, which passes transversely through the cylinder and plays in a slot, $b$, in the same. This bolt $a$ passes through a projecting portion of one of the distributing-plates, so as to effect the dropping of the seed from each compartment at intervals, hereinafter described.

By reference to the drawings, Figs. 3, 4, 5, and 6, the manner of dropping the seed from the two seed-compartments will be understood.

F is a partition extending up from a fixed plate, G, to the cover E, or top of the case A. This cover is made so as to be taken off when filling the two compartments with seed. The plate G is fixed to the case A by a bolt passing through suitable eyes in the plate.

I is a stem passing up through the center of the case $a$, and furnished with a handle on its top for giving to it a semi-rotating movement. This stem I passes loosely through the center of the plate G, and is fixed to a movable plate, G', by a bolt, $a$, as before described, so that by the movement of the stem I this plate G' and also the plunger C are operated simultaneously. This plate G' works upon a plate, G'', which is fixed by screws to the top of the piece H, though which are two vertical holes communicating with the chamber in the mouth-piece B, through which holes the seed pass, so as to be dropped by the plunger when it is elevated.

The plate G (shown clearly by Fig. 6) has two raised portions, $e\ e'$, with brushes $f\ f$. The portion $e'$ separates one seed-chamber from the other, while the former, $e$, communicates with both chambers or compartments. Directly under this plate is situated the movable plate G, as shown by Fig. 6, which has two seed-openings, $g\ g$, which alternately receive and drop the seed through the holes $r\ r$ in the block H. This plate has also two projecting lugs, $i$, Figs. 3 and 6, which play about in the pumpkin-seed chamber and carry the seed over an opening in the lower fixed plate, G'', where they are dropped in the return motion of the plate G', the outlet being brought directly under this opening. The corn is dropped through opening $g'$, when it is brought over a hole, $r$, in the block H alternately, as the plate G' is moved back and forth by the stem I.

The plate G'', which is secured to the block H, has two openings, $k\ k$, which are directly over the holes $r\ r$ in said block. This implement is used as follows: The corn is placed in the larger compartment and the pumpkin-seed in the smaller one. The mouth-piece is pressed into the earth by supplementary handle S. The sower then takes hold of the handle on the stem I and gives it one turn, which operation brings the opening $g'$ of the plate G' over its opening $k$ in plate G'', and the bolt $a$ raises the plunger C in consequence of its working in the oblique slotted plate D, and the corn is dropped into the earth through the hole $r$ in block H. The handle of stem I is then reversed and the plunger E is depressed. At the same time the pumpkin-seed falls through the passage formed by the openings $g$, $k$, and $r$ down into the mouth-piece B, behind the plunger C. The implement being removed to another spot for dropping the seed and forced into the earth, as before mentioned, the movement of the stem is again reversed, which raises the plunger and drops the seed already in the mouth B, and also opens a passage for a charge of corn, which drops in the same hole with the pumpkin-seed. The pumpkin-seed is again deposited into the mouth-piece by the operation of depressing or closing the plunger, as before described.

What I claim as my invention, and desire to secure by Letters Patent, is—

The partition F, introduced in the cylinder A for separating the seed, in combination with the plates G, G', and G'', the plate G being provided with projecting lugs $i$, forming a channel for dropping the pumpkin-seed as the plate is semi-rotated, the whole being arranged and operating simultaneously with the plunger C, as and for the purposes herein set forth.

H. C. FAIRCHILD.

Witnesses:
S. B. ELDRIDGE,
A. CHAMBERLIN.